(12) United States Patent
Huang

(10) Patent No.: US 6,714,269 B1
(45) Date of Patent: Mar. 30, 2004

(54) FRONT-SIDE REPAIRABLE TFT-LCD AND METHOD FOR MAKING

(75) Inventor: Tinghui Huang, Hsinchu (TW)

(73) Assignee: Industrial Technology Research Institute, Hsin Chu (TW)

(*) Notice: Subject to any disclaimer, the term of this patent is extended or adjusted under 35 U.S.C. 154(b) by 0 days.

(21) Appl. No.: 09/273,691

(22) Filed: Mar. 22, 1999

(51) Int. Cl.⁷ .................. G02F 1/1333; G02F 1/1343
(52) U.S. Cl. .................. 349/54; 349/55; 349/59
(58) Field of Search .................. 349/54, 42, 59, 349/55, 110, 192

(56) References Cited

U.S. PATENT DOCUMENTS

| | | | | |
|---|---|---|---|---|
| 5,517,341 A | * | 5/1996 | Kim et al. | 359/59 |
| 5,600,460 A | * | 2/1997 | Yamamoto et al. | 349/54 |
| 5,684,547 A | * | 11/1997 | Park et al. | 359/59 |
| 5,696,566 A | * | 12/1997 | Kim et al. | 349/39 |
| 5,995,178 A | * | 11/1999 | Fujikawa et al. | 349/55 |
| 6,025,892 A | * | 2/2000 | Kawai et al. | 349/43 |
| 6,100,948 A | * | 8/2000 | Kim et al. | 349/39 |
| 6,317,176 B1 | * | 11/2001 | Kim et al. | 349/54 |

* cited by examiner

Primary Examiner—Tarifur R. Chowdhury
Assistant Examiner—Mike Qi
(74) Attorney, Agent, or Firm—Tung & Associates

(57) ABSTRACT

A front-side repairable TFT-LCD assembly and a method for fabricating such repairable assembly are disclosed. In the assembly, at least one repair line that is positioned outside of and in parallel with a circuitry on the TFT-LCD is first laid out, while a black matrix film is coated on a glass substrate and patterned/formed with a multiplicity of apertures by a photolithographic/etching method. The multiplicity of apertures allows a repair laser to go through the apertures for effectuating a repair on a gate busline or on a data busline at a cross-over point with a repair line. The present invention further discloses a method for repairing a front-side repairable TFT-LCD assembly by first providing a front-side repairable assembly, then testing the assembly to locate defective circuit in a circuitry, and then irradiating a laser beam through a multiplicity of apertures in the black matrix film coated inside the LCD assembly to carry out a repair on the at least one defective circuit.

20 Claims, 2 Drawing Sheets

FRONT-SIDE REPAIRABLE TFT-LCD AND METHOD FOR MAKING

FIELD OF THE INVENTION

The present invention generally relates to a TFT-LCD assembly and a method for making and more particularly, relates to a TFT-LCD assembly which can be laser repaired from the front-side of the assembly and a method for making the front-side repairable TFT-LCD assembly.

BACKGROUND OF THE INVENTION

In recent years, large liquid crystal cells have been used in flat panel displays. The liquid crystal cells are normally constructed by two glass plates joined together with a layer of a liquid crystal material sandwiched inbetween. The glass substrates have conductive films coated thereon with at least one of the substrates being transparent. The substrates are connected to a source of power to change the orientation of the liquid crystal material. A possible source of power is a thin film transistor that is used to separately address areas of the liquid crystal cells at very fast rates. The TFT driven liquid crystal cells can be advantageously used in active matrix displays such as for television and computer monitors.

As the requirements for resolution of liquid crystal monitors increase, it becomes desirable to address a large number of separate areas of a liquid crystal cell, called pixels. For instance, in a modem display panel, more than 3,000,000 pixels may be present. At least the sane number of transistors must therefore be formed on the glass plates so that each pixel can be separately addressed and left in the switched state while other pixels are addressed.

Thin film transistors are frequently made with either a polysilicon material or an amorphous silicon material. For TFT structures that are made of amorphous silicon material, a common structure is the inverted staggered type which can be back channel etched or tri-layered. The performance of a TFT and its manufacturing yield or throughput depend on the structure of the transistor. For instance, the inverted staggered back channel etched TFT can be fabricated with a number of six masks, whereas other types of inverted staggered TFT require a minimum number of nine masks. Ale specification for a typical inverted staggered back channel etched TFT includes an amorphous silicon that has a thickness of 3,000 Å, a gate insulator of silicon nitride or silicon oxide, a gate line of Mo/Ta, a signal line of Al/Mo and a storage capacitor. The requirement of a thick amorphous silicon layer in the TFT device is a w a for achieving a high yield fabrication process since deposition of amorphous silicon is a slow process. A major benefit for the amorphous silicon TFT is its low leakage current which enables a pixel to maintain its voltage. On the other hand, an amorphous silicon TFT has the drawback of a low charge current (or on current) which requires an excessive amount of time for a pixel to be charged to its required voltage.

A second type of TFT is made by using a polysilicon material. Polysilicon is more frequently used for displays that are designed in a smaller size, for instance, up to three inch diagonal for a projection device. At such a small size, it is economical to fabricate the display device on a quartz substrate. Unfortunately, large area display devices cannot be normally made on quartz substrates. The desirable high performance of polysilicon can therefore realized only if a low temperature process can be developed to enable the use of non-quartz substrates. For instance, in a more recently developed process, large area polysilicon TFT can be manufactured at processing temperatures of less than 600° C. In the process, self-aligned transistors are made by depositing polysilicon and gate oxide followed by source/drain regions which are self-aligned to the gate electrode. The device is then completed with a thick oxide layer, an ITO layer and aluminum contacts.

Polysilicon TFT have the advantage of a high charged current (or current) and the drawback of a high leakage current. It is difficult to maintain the voltage in a pixel until the next charge in a polysilicon TFT due to its high leakage current. Polysilicon also allows the formation of CMOS devices, which cannot be formed by amorphous silicon. For the fabrication of larger displays, a higher mobility may be achieved by reducing the trap density around the grain boundaries in a hydrogenation process.

FIG. 1 shows an enlarged, cross-sectional view of a conventional amorphous silicon TFT structure. Amorphous TFT 10 is built on a low cost glass substrate 12. On top of the glass substrate 12, a gate electrode 14 is first deposited of a refactory metal such as Cr, Al or Al alloy and then formed. A gate insulating layer 16 is normally formed in an oxidation process. For instance, a high density $TaO_x$ on a Ta gate can be formed to reduce defects such as pin holes and to improve yield. Another gate insulating layer 20 is then deposited of either silicon oxide or silicon nitride. An intrinsic amorphous silicon layer 22 is then deposited with a n$^+$doped amorphous silicon layer 24 deposited on top to improve its conductivity. Prior to the deposition of the doped amorphous silicon layer 24, an etch stop 26 is first deposited and formed to avoid damages to the amorphous silicon layer 22 in a subsequent etch process for a contact hole. The doped amorphous silicon layer 24 is formed. Boron ions are normally used to achieve p$^+$polarity. A drain region 30 and a source region 32 are then deposited and formed with a pixel electrode layer 34 of ITO (indium-tin-oxide) deposited and formed on top. The drain region 30 and the source region 32 are normally deposited of a conductive metal layer. A suitable conductive metal may be a bilayer of Cr/Al. The structure is then passivated with a passivation layer 36.

A second conventional inverted staggered type TFT 40 is shown in FIG. 2. The TFT 40 is frequently called the back channel etched type inverted staggered TFT. A gate electrode 42 is first formed on a non-conducting glass substrate 38. The gate electrode 42 is connected to a gate line (not shown) laid out in the row direction. A dielectric material layer 44 of either silicon oxide or silicon nitride is used to insulate the gate electrode 42. After an amorphous silicon layer 46 and a contact layer 48 are sequentially deposited, patterned and etched, source electrode 50 and drain electrode 52 are formed to provide a channel 54 in-between the two electrode, hence the name back channel etched TFT. The source electrode 50 of each TFT is connected to a transparent pixel electrode 56 independently formed in the area surrounded by the gate lines and the drain lines (not shown). A transparent passivation layer 58 of a material such as silicon nitride is deposited on the completed structure.

As shown in FIG. 2, the gate electrode 42 is frequently formed of chromium or other similar metals on the transparent glass substrate 38. The dielectric layer 44 of gate oxide or silicon nitride is formed to insulate the upper surface of the glass substrate 38 including the top surface of the gate electrode 42. A semi-conducting layer 46, which may be formed of amorphous silicon is stacked on the dielectric film 44 over the gate electrode 42. The drain electrode 52 and the source electrode 50 are formed on the semi-conducting film 46 and are separated from each other by a predetermined distance forming the channel section 54. The two electrodes each has a contact layer of 48 and a metal layer which are electrically connected to the semi-conducting layer 46. The transparent electrode 44 may be formed of ITO.

In modem TFT-LCD devices, once the components are assembled together, it is difficult to make repairs in defective circuits found in the TFT. The defects are normally found by a technique utilizing a KLA Acrotec® inspection device with digital image processing. In the technique, panel sizes of up to 50 cm ×50 cm can be accommodated and detected by an optical system which operates in two different modes, i.e., in low magnification to locate defects and in high magnification to identify the defects. Defects found in the peripheral drive circuits in an active matrix device frequently cause more serious problems such as area defects in the displays, while defects in pixel arrays with TFT switches frequently cause point or line defects. It is therefore essential to provide a repair capability on the peripheral drive circuits. Normal redundant TFT circuits are not adequate for repairing open defects in the circuits. A laser connection and disconnection method must therefore be utilized in correcting the defects. For instance, by using the laser connection and disconnection methods, a faulty shift register can be exchanged for a spare by disconnecting the input/output lines of the faulty circuit and connecting the I/O lines of the spare circuit.

In a laser repair method, the repair is normally made by using a pulsed YAG laser which is operated at 1.06 $\mu$m with a of 8 ns. A doped polysilicon layer can be used as the conduction layer in a laser connection and disconnection method. For instance, when repairing a defect between aluminum and polysilicon lines which are separated by an insulating layer of silicon nitride, an Ohmic contact can be made through the nitride layer by irradiating with the YAG laser at a site where the two lines are overlapped. A YAG laser having 20~60 W/$\mu$m$^2$ power density may be used in an air ambient for a repair pattern of about 4 $\mu$m ×4 $\mu$m in size. Such repair is normally performed from the backside of the TFT-LCD through the glass since a black matrix film coated on the front-side glass plate prevents accurate locating of the defects. The existing though-the-glass repair techniques are therefore limited to repairs that can only be carried out on the backside of the device for making repairs on a drive circuit.

Most conventional laser repair techniques repairs lines located inside TFT-LCD panels by wielding through backside laser irradiation. Other conventional solder repairs of lines are capable of repairing a PCB (printed circuit board) on the TFT-LCD driving board. When a broken data line or bus line is detected, a repair line is used in welding the connection. When a scan line, or a gate bus line, is shorted with a data bus line, a laser radiation may be used to cut off all connections around the circuit and then reconnect with a repair line to resume connection with the outside circuit. These repairs are made from the backside of the device. The repair task is much simpler when only a TFT substrate array is involved and that no upper glass substrate is assembled to the TFT. A repair line may be melted down onto a scan line or a data line for reconnection, However, when a LCD has been assembled to a TFT forming an assembly, any defects found must be repaired from the backside so that laser radiation can go through a glass without being blocked by a black matrix film. A TFT-LCD assembly must be reversed by reversing the coordinates in a computer to find the defect location. It should be noted that the LCD discussed here are generally of the reflecting type and therefore, no diffuser is involved in the assembly.

The conventional laser repair technique is therefore impossible for making front side repairs due to the blockage of light by the black matrix film and the resulting difficulties in locating the defects. When the TFT-LCD gate buslines are fabricated of non-A based materials, backside laser repair technique does not produce a reliable result. Furthermore, in the backside laser repair technique, the soldering of repair lines are located on the PCB which enhances the driving signal coupling and distortion effect Moreover, since not all broken wires show up when the TFT device is fabricated and tested in an array form, i.e., defects may be formed only when a signal is sent through the circuit for testing by a short in the circuit and heat generated in the defective circuit components. A technique for repairing a TFT-LCD which has a black matrix film inside the assembly must be provided so that the assembly can be repaired without being taken apart and without the risk of scrapping the whole assembly.

It is therefore an object of the present invention to provide a method for repairing a TFT-LCD assembly that does not have the drawbacks or shortcomings of the conventional repair methods.

It is another object of the present invention to provide a method for repairing a TFT-LCD assembly that does not have to be performed on the backside of the assembly.

It is a further object of the present invention to provide a method for repairing a TFT-LCD assembly that can be carried out from the front side of the assembly through a black matrix film.

It is another further object of the present invention to provide a method for repairing a TFT-LCD assembly by first forming a multiplicity of apertures black matrix film prior to the assembly of the front glass to the TFT-LCD.

It is still another object of the present invention to provide a method for repairing a TFT-LCD assembly by providing at least one repair line positioned outside of and in parallel with a circuitry on the TFT-LCD which intersects a multiplicity of buslines with an insulating layer thereinbetween.

It is yet another object of the present invention to provide a front-side repairable TFT-LCD assembly which includes at least one repair line positioned outside of and in parallel with a circuitry on the TFT-LCD and a black matrix film coated on a front glass panel and patterned with a multiplicity of apertures such that a repair laser may go through the apertures for performing a repair.

It is still another further object of the present invention to provide a front-side repairable TFT-LCD assembly that includes at least five repair lines positioned outside of and in parallel with a circuitry on the TFT-LCD which intersects the multiplicity of buslines with an insulating layer thereinbetween such that a repair laser may go through a provided in a black matrix film and effectuate either a cutting of the buslines or a fusing of a busline with a repair line.

It is yet another further object of the present invention to provide a method for repairing a front-side repairable TFT-LCD assembly by first providing the TFT-LCD assembly with a black matrix film that has a multiplicity of apertures formed therein and at least one repair line laid out around a circuitry on the TFT-LCD, testing the TFT-LCD in a panel power-up test and locating at least one defective circuit in the circuitry, and irradiating a laser beam though the multiplicity of apertures to effectuate a repair on the at least one defective circuit.

SUMMARY OF THE INVENTION

In accordance with the present invention, a front-side ruble TFT-LCD assembly and a method for fabricating such assembly are provided.

In a preferred embodiment, a front-side repairable TFT-LCD assembly is provided which includes a TFT-LCD equipped with a first multiplicity of buslines, at least one repair line positioned outside of and in parallel with circuitry on the TFT-LCD, the at least one repair line intersects the first multiplicity of buslines with an insulating layer thereinbetween, and a black matrix film coated on a glass substrate positioned juxtaposed to the repair lines and buslines, the black matrix film has a second multiplicity of apertures formed therein each corresponding to a location where one of the at least one repair line intersects the first multiplicity of buslines allowing a laser to pass therethrough.

The front-side repairable TFT-LCD assembly may further include at least three spaced-apart and parallel repair lines positioned outside of and in parallel with a circuitry of the TFT-LCD, or include at least five spaced-apart and parallel repair lines. The first multiplicity of buslines may include gate buslines and data buslines. The glass substrate which has the black matrix film coated thereon is used as a front cover for the TFT-LCD assembly. The second multiplicity of apertures formed in the black matrix film allows a laser to pass therethrough for welding a repair line to a busline. The second multiplicity of apertures formed in the black matrix film allows a laser beam to pass therethrough for severing a line. The black matrix film may be formed by a lithographic/etching method. The second multiplicity of apertures formed in the black matrix film may be used for laser repair in an array test or in a panel power-up test.

The present invention is further directed to a method for fabricating a front-side repairable TFT-LCD assembly by the operating steps of first providing a TFT-LCD equipped with a first multiplicity of buslines, providing at least one repair line laid out around a circuitry on the TFT-LCD, the at least one repair line intersects the first multiplicity of buslines with an insulating layer thereinbetween, coating a black matrix film on a glass substrate used as a cover plate for the TFT-LCD, patterning the black matrix film and forming a second multiplicity of apertures therein each corresponds to a crossover point where one of the at least one repair line intersects the first multiplicity of buslines and mounting the glass substrate which has the black matrix film patterned with a second multiplicity of apertures on the TFT-LCD as a cover plate.

The method for fabricating a front-side repairable TFT-LCD assembly may further include the step of patterning the black matrix film by a photolithographic method. The method may further include the step of forming the second multiplicity of apertures in the black matrix film by an etching method. The method may further include the step of passing a laser beam through at least one of the second multiplicity of apertures in the black matrix film to effectuate a repair on the TFT-LCD. The method may further include the step of testing the TFT-LCD in an array test or in a panel power-up test.

The method for fabricating a front-side repairable TFT-LCD assembly may further include the step of providing at least three spaced-apart and parallel repair lines laid out around a circuitry on the TFT-LCD, the at least three repair lines intersect the first multiplicity of buslines with an insulating layer thereinbetween. The method may further include the step of providing at least five spaced-apart and parallel repair lines. The first multiplicity of buslines may include gate buslines and data buslines. The method may further include the step of passing a laser beam through at least one of the second multiplicity of apertures in the black matrix layer to severe a busline or a gate line that is connected to a defective circuit in the circuitry or passing a laser beam through at least one of the second multiplicity of apertures in the black matrix layer to weld a repair line to a busline by fusing through the insulating layer.

The present invention is still further directed to a method for repairing a front-side repairable TFT-LCD assembly which can be carried out by the steps of providing a TFT-LCD equipped with a first multiplicity of buslines, providing at least one repair line laid out around a circuitry on the TFT-LCD, the at least one repair line intersects the first multiplicity of buslines with an insulating layer thereinbetween, coating a black matrix film on a glass substrate used as a cover plate for the TFT-LCD, patterning the black matrix film and forming a second multiplicity of apertures therein each corresponds to a cross over point where one of the at least one repair line intersects the fist multiplicity of buslines, mounting the glass substrate which has the black matrix film patterned with a second multiplicity of apertures therein on the TFT-LCD as a cover plate, testing the TFT-LCD in an array test or in a panel power-up test and locating at least one defective circuit in the circuitry, and irradiating a laser beam through the second multiplicity of apertures in the black matrix film to effectuate a repair on the at least one defective circuit.

The method for repairing a front-side repairable TFT-LCD assembly may further include the step of effectuating a repair on the at least one defective circuit by severing at least one busline that is connected to the at least one defective circuit. The method may further include the step of effectuating a repair on the at least one defective circuit by welding at least one repair line to at least one busline for bypassing the at least one defective circuit.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a front-side repairable TFT-LCD assembly which is construct by at least one repair line that is positioned outside of and in parallel with a circuitry on the TFT-LCD wherein the at least one repair line intersects a first multiplicity of buslines with an insulating layer thereinbetween, and a black matrix film coated on a glass substrate positioned immediately adjacent to the repair lines and the buslines, the black matrix film has a second multiplicity of apertures formed therein each corresponding to a location where one of the at least one repair line intersects the first multiplicity of buslines and thereby allowing a repair laser to pass therethrough for effectuating a repair by severing or by welding. The present invention further discloses a method for fabricating a front-side repairable TFT-LCD assembly which includes the steps of providing at least one repair line laid out around a circuitry on the TFT-LCD, the at least one repair line intersects the first multiplicity of buslines with an insulating layer thereinbetween, then patterning a black matrix film coated on a glass substrate and forming a second multiplicity of apertures such that each of the apertures corresponds to a cross-over point where one of the at least one repair line intersects a first multiplicity of buslines equipped on the TFT-LCD, and then mounting the glass substrate to the TFT-LCD as a cover plate.

The present invention still further discloses a method for repairing a front-side repairable TFT-LCD assembly by the steps of first providing at least one repair line that is laid out around a circuitry on the TFT-LCD, the at least one repair line intersects the first multiplicity of buslines with an insulating layer thereinbetween, then patterning a black matrix film which is coated on a glass substrate to form a second multiplicity of apertures with each aperture corresponds to a cross-over point where one of the at least one repair line intersects a first multiplicity of buslines equipped on the TFT-LCD, the testing the TFT-LCD and locating at least one defective circuit in the circuitry, and irradiating a laser beam through the second multiplicity of apertures in the black matrix film to effectuate a repair on the at least one defective circuit.

Figure 5:
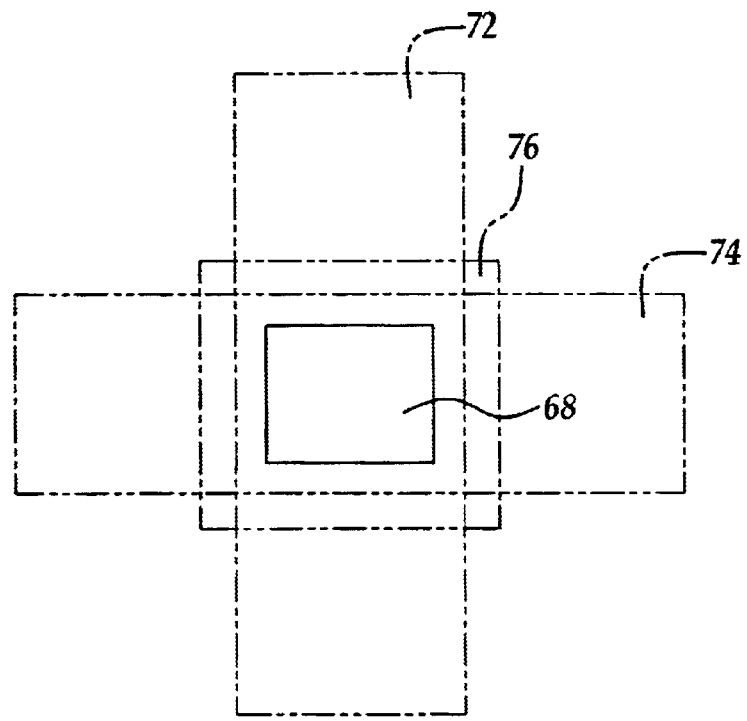
FIG. 5 is an enlarged, plane view of the present invention device having a data busline and a gate busline overlapped and insulated with an amorphous silicon layer thereinbetween and an aperture opened through the black matrix layer.

In the present invention novel method, a laser repair window in the black matrix film is first opened directly above a repair line/busline cross-over point. The laser repair window opened is normally smaller than the repair line/busline cross-over. This is shown in FIG. 5. By utilizing the present invention novel method, a front-side laser repair technique can be advantageously used which does not cause back or reflective beam of the black matrix film.

The present invention novel method therefore provides a multiplicity of apertures in a black matrix layer by a photolithographic method and then forms apertures by a chemical etching or physical etching method. The present invention novel method is executed by directing a laser beam on the front-side of the TFT-LCD such that the beam may go through the glass substrate, the aperture in the black matrix film and, optionally, through a chrome oxide layer to either severe or weld a circuit defect. The black matrix layer may be formed of chromium, chromium/chromium oxide or of a polymeric based black matrix material.

In practicing the present invention novel method, a liquid crystal cell is first tested before it is assembled to a driver IC. The test may be conducted advantageously in an array test wherein the line width of the buslines is between about 25 $\mu$m and about 45 $\mu$m. The defective circuits may then be repaired prior to the assemble of the LC cell with the driver IC. Prior to the assembly, a black matrix film coated on a cover glass substrate is first patterned in a photolithographic method and then formed in etching step a multiplicity of apertures. For instance, in a VGA LCD display device, where there are 640×480 buslines in total, the total number of required is 5×[(480×2)+(640×3×2)] when five repair lines are utilized. For other LCD devices, such as SVGA, XGA, SXGA, and UXGA, different numbers of apertures may be formed to achieve the same advantageous result.

Figure 1:
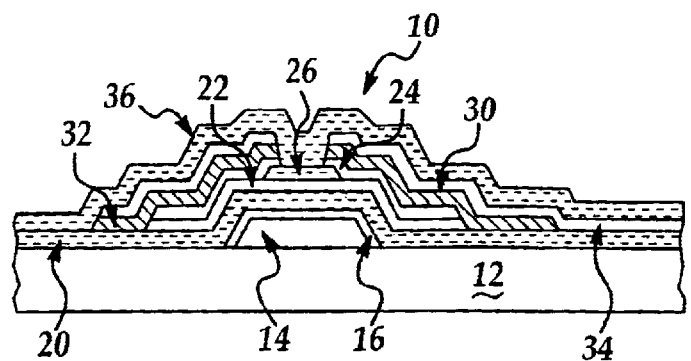
FIG. 1 is an enlarged, cross-sectional view of a conventional tri-layered type inverted staggered TFT.
Figure 2:
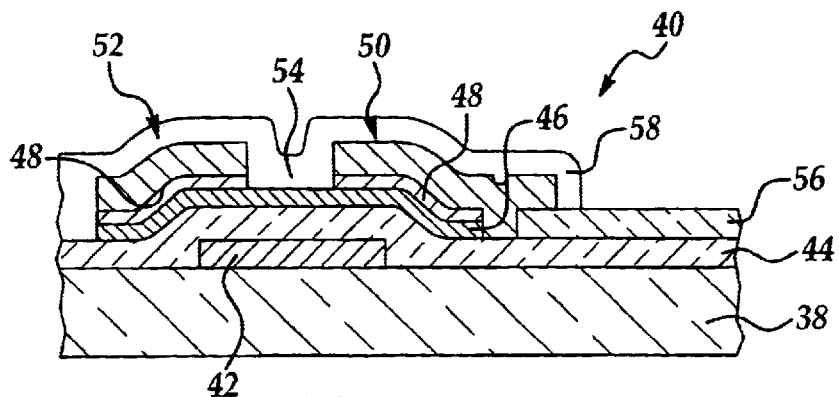
FIG. 2 is an enlarged, cross-sectional view of a back channel etched type inverted staggered TFT.
Figure 3:
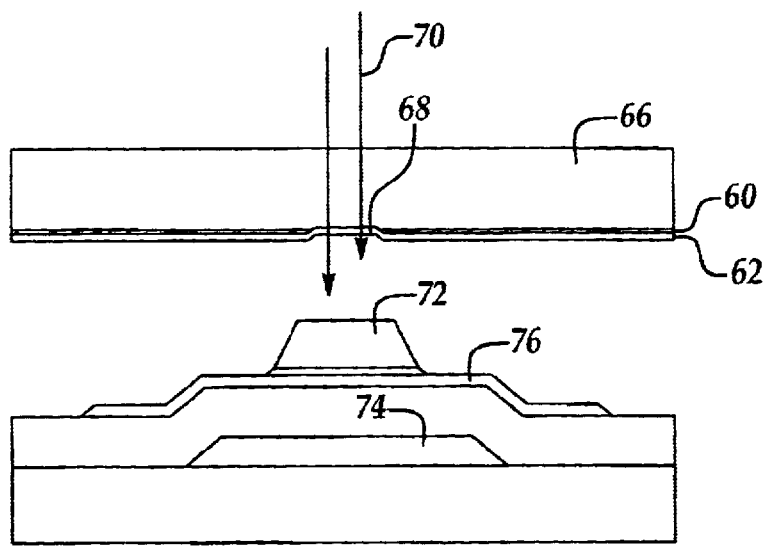
FIG. 3 is an enlarged, cross-sectional view of a present invention back channel etched TFT having a black matrix layer formed with a multiplicity of apertures.
Figure 4:
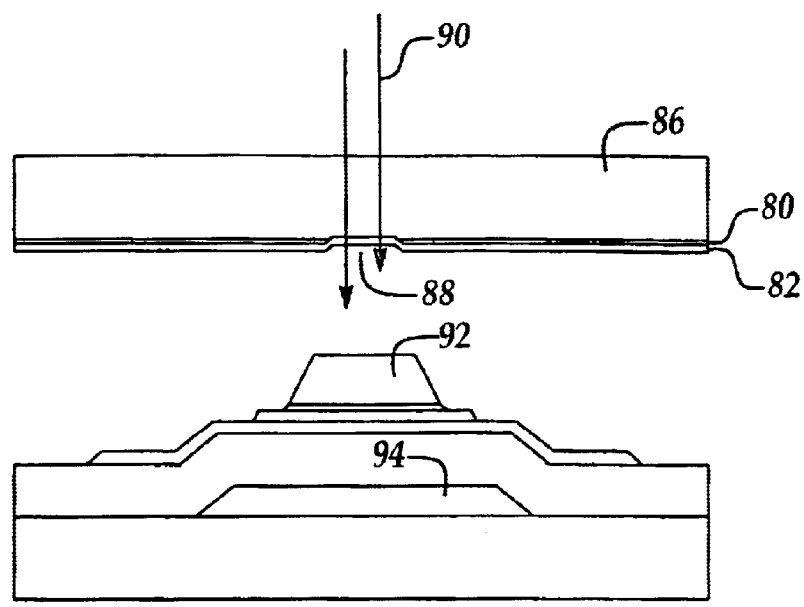
FIG. 4 is an enlarged, cross-sectional view of the present invention tri-layered type inverted staggered TFT having a black matrix layer formed with a multiplicity of apertures.

Referring now to FIGS. 3 and 4 wherein an enlarged, cross-sectional view of a back channel etched TFT and a tri-layered TFT having a black matrix film formed with a multiplicity of apertures are shown, respectively. It should be noted that, as shown in FIG. 3, a black matrix film 60 and a transparent ITO layer 62 are first coated on a glass substrate 66. The black matrix layer 60 is then formed in a photolithographic/etching step with apertures 68. A laser beam 70 can go through the black matrix apertures 68 to effectuate a repair procedure either on the source/drain busline 72 or on the gate busline 74, or both.

A similar procedure is shown in FIG. 4 for a tri-layered TFT structure in which a black matrix layer 80, a transparent ITO layer 82 are coated on a glass substrate 86. A multiplicity of apertures 88 are formed in the black matrix layer 80 prior to the deposition of the ITO layer 82 for allowing a laser repair beam 90 to go through. The laser repair beam 90 effectuates a repair procedure either on the source/drain baseline 92, or on the gate busline 94 or on both.

An enlarged, plane view of the data busline 72, the gate busline 74, the insulating layer such as an amorphous silicon layer 76 and the aperture 68 is shown in FIG. 5. It should be noted that the dimension of the aperture 68 is normally smaller than the overlapped area between the data busline 72 and the gate busline 74. The repair method by the present invention novel technique is therefore conducted at the cross-over point between the gate busline 74 and the data busline 72 where defective circuits are likely formed due to bad insulation, leakage, particle contamination or short. By utilizing the present invention novel method, gate line and data line may be melted together through the insulating layer at the cross-over point while the signal is detoured around the cross-over point.

The present invention novel method can therefore be advantageously used in preparing defects in either a liquid crystal module prior to its assembly with a driver IC, or in a TFT-LCD assembly from a front-side of the assembly. By utilizing the present invention novel method, an assembled TFT-LCD assembly does not need to be disassembled in order to perform a repair task. The present invention method therefore allows the saving of a liquid crystal panel from being scrapped due to a defective driver IC. This is particularly important in the assembly of large sized liquid crystal panels of high costs.

The present invention novel method for repairing a TFT-LCD assembly and a novel front-side repairable TFT-LCD have therefore been amply demonstrated in the above descriptions and in the appended drawings of FIGS. 3, 4 and 5.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

What is claimed is:

1. A front-side repairable TFT-LCD assembly comprising:
    a TFT-LCD equipped with a first multiplicity of buslines,
    at least one repair line positioned outside of and in parallel with a circuitry on said TFT-LCD, said at least one repair line intersects said first multiplicity of buslines with an insulating layer therein between, and
    a black matrix film coated on a glass substrate positioned juxtaposed to said repair lines and buslines, said black matrix film having a second multiplicity of apertures formed therethrough each corresponding to a location where one of said at least one repair line intersects said first multiplicity of buslines allowing a laser to pass therethrough for welding a repair line to a busline.

2. A front-side repairable TFT-LCD assembly according to claim 1 further comprising at least three spaced-apart and, parallel repair lines positioned outside of and in parallel with a circuitry of said TFT-LCD.

3. A front-side repairable TFT-LCD assembly according to claim 1 further comprising at least five spaced apart and parallel repair lines positioned outside of and in parallel with a circuitry of said TFT-LCD.

4. A front-side repairable TFT-LCD assembly according to claim 1, wherein said first multiplicity of buslines comprises gate buslines and data buslines.

5. A front-side repairable TFT-LCD assembly according to claim 1, wherein said glass substrate having said black matrix film coated thereon is used as a front cover in said TFT-LCD assembly.

6. A front-side repairable TFT-LCD assembly according to claim 1, wherein said second multiplicity of apertures formed in said black matrix film allows a laser beam to pass therethrough for severing a busline.

7. A front-side repairable TFT-LCD assembly according to claim 1, wherein said black matrix film is formed in a photolithographic/etching method.

8. A front-side repairable TFT-LCD assembly according to claim 1, wherein said second multiplicity of apertures formed in said black matrix film is used fox layer repair after an array test or after a panel power-up test.

9. A method for fabricating a front-side repairable TFT-LCD assembly comprising the steps of:
provideing a TFT-LCD equipped with a first multiplicity of buslines,
providing at least one, repair line laid out around a circuitry on said TFT-LCD, said at least one repair line intersects said first multiplicity of buslines with an insulating layer thereinbetween,
coating a black matrix film on a glass cover plate in said TFT-LCD,
patterning said black matrix film and forming a second multiplicity of apertures therein each corresponds to a cross-over point where one of said at least one repair line intersects said first multiplicity of buslines,
mounting said glass substrate having said black matrix film patterned with a second multiplicity of apertures therein on said TFT-LCD as a cover plate, and
passing a laser beam through at least one of void second multiplicity of apertures in said black matrix layer to weld a repair line to a busline by fusing through said insulating layer.

10. A method for fabricating a front-side repairable TFT-LCD assembly according to claim 9 further comprising the step of patterning said black matrix film by a photolithographic method.

11. A method for fabricating a front-side repairable TFT-LCD assembly according to claim 9 further comprising the step of forming said second multiplicity of apertures in said black matrix film by an etching method.

12. A method for fabricating a front-side repairable TFT-LCD assembly according to claim 9 further comprising the step of passing a laser beam through at least one of said multiplicity of apertures in said black matrix film to effectuate a repair on said TFT-LCD.

13. A method for fabricating a front-side repairable TFT-LCD assembly according to claim 9 further comprising the step of testing said TFT-LCD in an array test in a panel power-up test.

14. A method for fabricating a front-side repairable TFT-LCD assembly according to claim 9 further comprising the step of providing at least three spaced-apart and parallel repair lines around a circuitry on said TFT-LCD, said at least three repair lines intersect said first multiplicity of buslines with an insulating layer thereinbetween.

15. A method for fabricating a front-side repairable TFT-LCD assembly according to claim 9 further comprising the step of providing at least five spaced-apart and parallel repair lines laid out around a circuitry on said TFT-LCD, said at least five repair lines intersect said first multiplicity of buslines with an insulating layer thereinbetween.

16. A method for fabricating a front-side repairable TFT-LCD assembly according to claim 9, wherein said first multiplicity of buslines comprises gate busline and data buslines.

17. A method for fabricating a front-side repairable TFT-LCD assembly according to claim 9 further comprising the stop of passing a laser beam through at least one of said second multiplicity of apertures in said black matrix layer to sever a busline or a gate line that is connected to a defective circuit in said circuitry.

18. A method for repairing a front-side repairable TFT-LCD assembly comprising the steps of:
providing a TFT-LCD equipped with a first multiplicity of buslines,
providing at least one repair line laid out around a circuitry on said TFT-LCD, said at least one repair line intersects said first multiplicity of busline with an insulating layer thereinbetween,
coating a black matrix film on a glass substrate used as a cover plate for said TFT-LCD,
patterning said black matrix film and forming a second multiplicity of apertures therein each corresponds to a cross-over point where one of said at least one repair line intersects said first multiplicity of buslines,
mounting said glass substrate having said black matrix film patterned with a second multiplicity of apertures therein on said TFT-LCD as a cover plate,
testing said TFT-LCD in an array test or in a panel power-up test and locating at least one defective circuit in said circuitry, and
irradiating a laser beam through said second multiplicity of apertures in said black matrix film to effectuate a repair on said at least one defective circuit.

19. A method for repairing a front-side repairable TFT-LCD assembly according to claim 18 further comprising the step of effectuating a repair on said at least one defective circuit by severing at least one busline that is connected to said at least one defective circuit.

20. A method for repairing a front-side repairable TFT-LCD assembly according to claim 18 further comprising the step of effectuating a repair on said at least one defective circuit by welding at least one repair line to at least one busline for bypassing said at least one defective circuit.

* * * * *